Sept. 24, 1968
R. A. BEESLEY ET AL
3,402,451
METHOD OF MAKING BLOWER WHEELS
Filed June 14, 1966
2 Sheets-Sheet 1
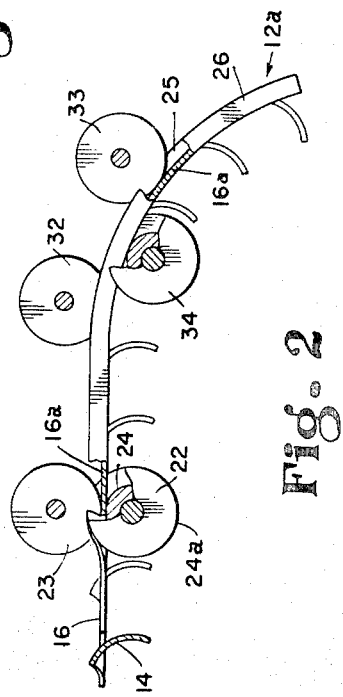
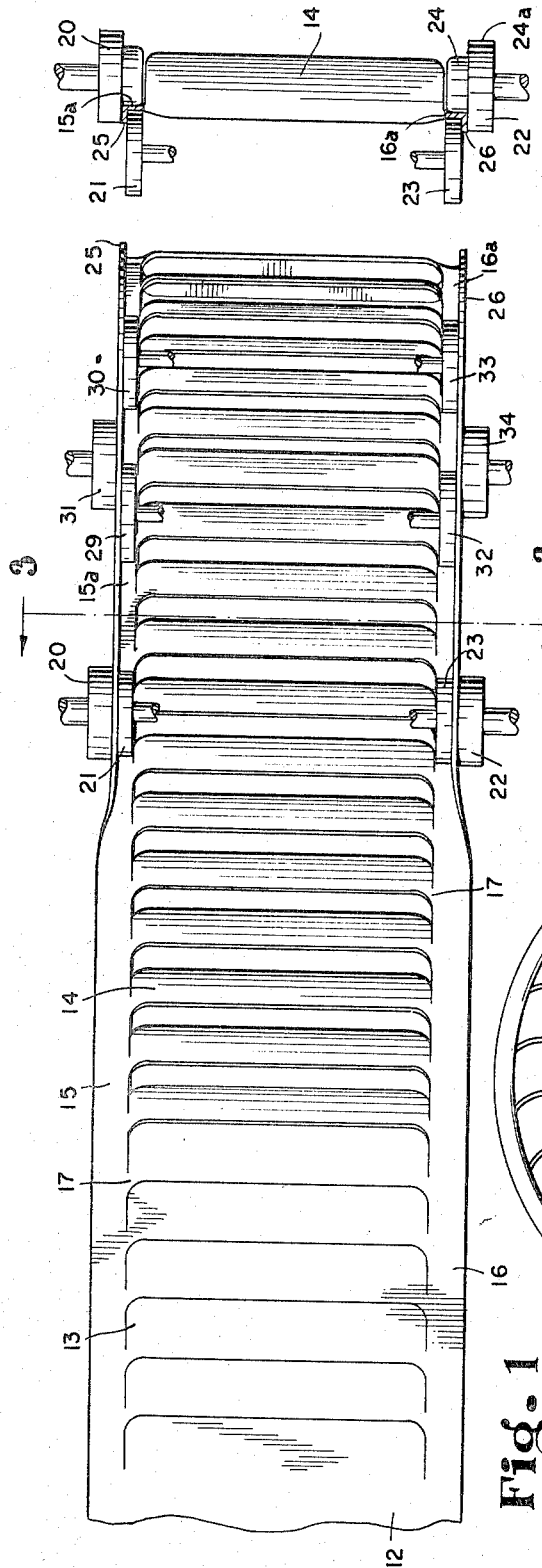
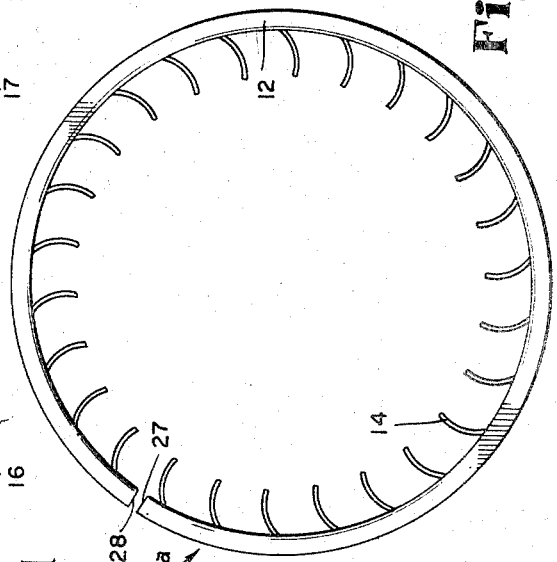
INVENTORS
Robert A. Beesley
John T. Thompson
BY
Herbert A. Winters
ATTORNEY Sept. 24, 1968     R. A. BEESLEY ET AL     3,402,451

METHOD OF MAKING BLOWER WHEELS

Filed June 14, 1966     2 Sheets-Sheet 2

INVENTORS
Robert A. Beesley
John T. Thompson
BY Herbert G. Minturn
ATTORNEY

United States Patent Office 3,402,451
Patented Sept. 24, 1968

3,402,451
METHOD OF MAKING BLOWER WHEELS
Robert A. Beesley, Westport, and John T. Thompson, Columbus, Ind., assignors to Vernco Corporation, Columbus, Ind.
Filed June 14, 1966, Ser. No. 557,418
5 Claims. (Cl. 29—156.8)

This invention relates to a method of making blower wheels of the drum type wherein there is a driving plate and a front ring, with arcuate air moving blades between the plate and ring wherein air enters the wheel through the ring and is discharged through and approximately tangentially of the wheel blades. The invention deals primarily with the method of preforming a ring and a back plate and applying them to the ends of the blades.

Theretofore, the ring has been made by stamping a circular piece of metal from a metal strip; flanging the metal piece about its peripheral portion; and stamping out the central area within the peripheral portion thereby forming a closed ring. This stamped out piece is of disc shape and is scrap material. This scrap material is greater in weight than is the only used part, the ring.

The invention may be generally described as forming first an approximately cylindrical grouping of a series of air moving blades, as integrally joining by their ends with end side strips or lands, from each of which there is an outturned flange, ends of the lands and their flanges abutting end to end, wherein the blades, lands and flanges are produced from a common length of sheet metal. Separate moldings are each formed into circular shape as split rings to fit over said flanges and be spun around the flanges. The molding length is such that the circumference thereof brings its ends into abutment as the spinning of it is completed. This abutment is approximately diametrically located opposite the blade land abutment.

The primary purpose of the invention is to make a blower wheel in most sizes without welding, brazing, or rivetting together any of its parts, in a more facile and economical manner as compared to known methods, and to make a stronger and very durable wheel without tendency to twist. When the wheel will have a diameter, for example around ten inches, the abutting ends of the lands and of the rings may be butt welded.

The invention is described in detail in its form as now best known, in reference to the accompanying drawings, in which FIG. 1 is a schematic diagram of initial steps in forming the bladed portion of a blower wheel;

FIG. 2 is a detail in side elevation and partial section of that part of means for the flanging and flange curving steps indicated in FIG. 1;

FIG. 3 is a view in vertical section on the line 3—3 in FIG. 1;

FIG. 4 is a view in end elevation of the bladed portion of the wheel as formed following the step indicated in FIGS. 1–3;

Figure 5:
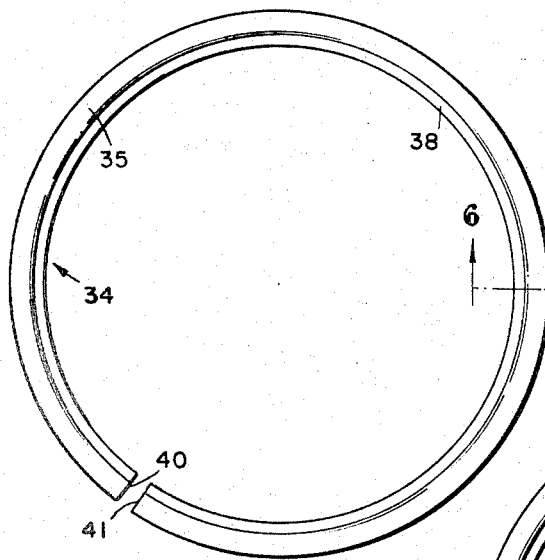
FIG. 5 is a top plan of a formed molding prior to being fitted over the end flange of the wheel portion shown in FIG. 4.

A strip 12 of sheet metal is progressively carried through a machine (not shown) first defining blanks 13 of blades 14 extending laterally across the strip 12, leaving lands 15 and 16 respectively along the outer ends of the blanks and blades, to which lands the ends of the blades remain integrally attached. The blanks 13 are pressed into the desired transverse arcuate contour and are twisted in necks 17 to the desired angle, each in reference to the lands. So far, this method of forming the strip 12 into the finished blades 14 secured to the laterally opposite lands 15 and 16 is old in this art.

The lands 15 and 16 are carried between means such as rolls for turning up flanges 25 and 26 respectively from and along the lands 15 and 16, this turning being effected preferably by employing cylindrical rolls 20, 21, and 22, 23 respectively which receive therebetween the lands 15 and 16, the outer rolls 21 and 23 being shaped to have a supporting underside roll portion 24 and an outer end larger diameter portion 24a. The land 16, for example, FIG. 1, passes in part width over the roll portion 24 to be held thereagainst by the upper roll 23, and the remaining outer part is turned upwardly to pass between the outer side of the roll 23, and the inner opposing side of the roll portion 24a. In this step, flanges 25 and 26 are formed to extend at approximately right angles, radially to the remaining portions 15a and 16a of the lands 15 and 16.

A length 12a of the bladed portion of the strip 12 is bent into a smooth, approximately cylindrical shape as indicated in FIG. 4 where the ends 27 and 28 approach one another. This curving of the strip 12 is best accomplished by passing it through two sets of rolls, one set on each side of the strip to have a set of rolls 29, 30 and 31 which engage the land 15a and the flange 25 on the one side and another set of rolls 32, 33 and 34 which engage the other land 16a and flange 26. The rolls 32 and 33 engage the upper side of the land portion 16a at spaced apart zones therealong, and the roll 34 presses upward from the under side of that land portion 16a between the rolls 32 and 33, to carry the land portion upwardly between said zones thereby setting up a bending strain, in curving the land and simultaneously bending the flange 26 which is constrained against lateral bending by passing between opposing faces of the rolls 32, 33 and 34. The rolls 29, 30 and 31 perform in the same manner in curving the land portion 15a to the same degree of curvature as that of the land 16a and flange 26.

The length of the strip 12a must be cut to the exact circumferential length of the circle of the flange as determined by the desired diameter thereof.

A molding 34 is formed and spun around the ring and plate ends of the cylindrically formed strip 12a so as to bring and hold those ends 27 and 28 in abutment and thus hold the desired diameter of the wheel.

Figure 6:
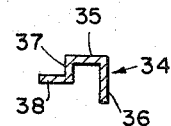
FIG. 6 is a vertical sectional view on the line 6—6 in FIG. 5.

This molding 34 constitutes essentially a rolled strip wherein a cross-section thereof is shown in FIG. 6 wherein there is a web 35 from which a leg 36 extends from along one side of the web at approximately a right angle thereto, although this angle is not critical and may be slighly obtuse as measured from under the web 35 as viewed in FIG. 6. A second leg 37 extends downwardly at approximately a right angle to the web 35, from the other side of the web 35. The transverse width of the web between the legs 36 and 37 is that which will sliding receive either of the flanges 25 and 26 between those legs. A foot 38 extends outwardly from the lower end of the leg 37. The length of the leg 36 exceeds that of the leg 37. A length of this molding 34 so formed is cut to an exact dimension such that the ends of the molding will abut one another when the molding is wrapping around either of the curved flanges 25 or 26. The length of the molding 34 is curved into approximate circular form as indicated in FIG. 5. The foot 38 turns radially inwardly.

Figure 7:
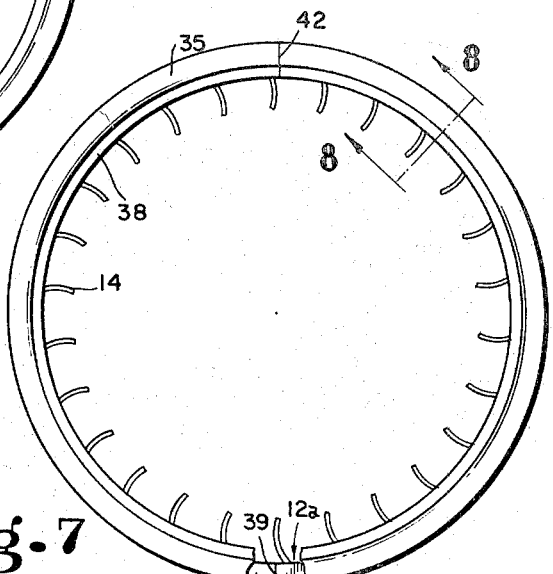
FIG. 7 is an end elevational view of the assembly of the parts of FIGS. 4 and 5, with a ring portion broken away.
Figure 8:
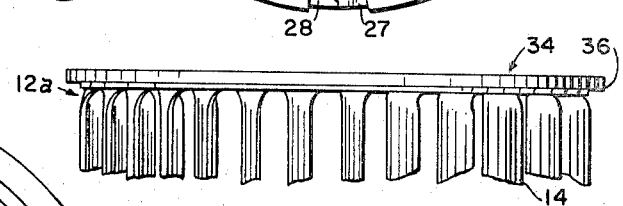
FIG. 8 is a transverse sectional view of the line 8—8 in FIG. 7 showing the molding as spun into a ring and into flange engagement.
Figure 9:
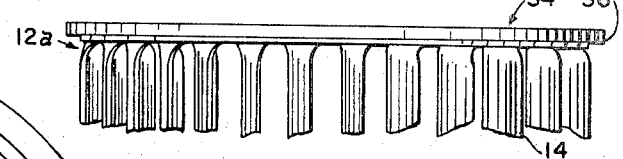
FIG. 9 is a side elevational view of an end portion of the structure of FIG. 7.

The strip 12a is received in a fixture (not shown) which holds that strip 12a in true cylindrical shape with its ends 27 and 28 in abutment on a line 39, FIG. 7. The molding 34, as indicated in FIG. 5, has its ends 40 and 41 initially sightly spread apart and is laid over the flange 25 (or flange 26) to straddle the flange and have the leg 36 carried down across the outer edge of the flange, and to have the other leg 37 pass down over the land portion 15a or 16a as the case may be, depending upon which side of the strip 12a is turned upwardly. The ends 40 and 41 are located to be approximately diametrically opposite the line 39 of the bladed strip 12a.

Beginning with either end 40 or 41 of the molding it is spun to press the leg 36 around under the flange 25 and down the outside of the land 15a, FIG. 5, and the leg 37 is pressed firmly against the inside of the land 15a, with the foot 38 extending radially of the wheel adjacent to the ends of the blades 14. In this spinning, the ends 40 and 41 come into abutment, FIG. 7, on the line 42. Due to the opposing portions of the spun legs of the molding 34 about the flange and interconnecting land portion, a very tight and rigid wheel ring is established. The staggering of the strip ends and of the molding ends around the circumference prevents these ends from spreading apart.

Figure 10:
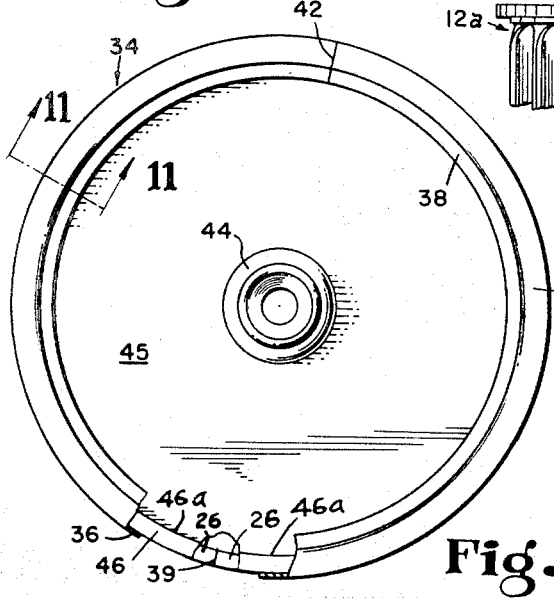
FIG. 10 is an end view in elevation of a back plate mounted on the wheel.
Figure 11:
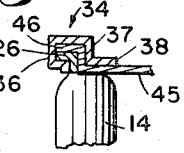
FIG. 11 is a sectional view on the line 11—11 in FIG. 10.

The opposite end, FIG. 10 of the strip 12a, carries a back plate 45. The outer peripheral edge portion of the plate 45 is formed to have a radial flange 46 which overlies the flange 26. The flange 46 is offset from the plane of the plate 45 by means of an integral ring 46a turned perpendicularly outwardly from the plate 45. This ring 46a bears circumferentially outwardly against the land portion 16a, and the flange 46 turns normally from the ring 46a to rest on the strip flange 26. The molding 34, referring to FIG. 11, fits down over the flanges 46 and 26 to have the leg 37 spun around the outturned (FIG. 11) portion of the flange 46 and the foot 38 radially extending over the plate 45, and the leg 36 spun around the outer edges of the flanges 46 and 26, under the flange 26 and downwardly over the land 16a. This method secures the back plate to the strip 12a and at the same time, holds that strip rigidly in its circumferential shape.

It is to be understood that the sequence of steps as set out in the foregoing description and in the appended claims does not necessarily have to be in those orders. The back plate may be secured to the blade strip prior to the spinning of the molding onto the blade strip. The method of shaping the strip into a cylinder and of forming the strip side flanges may be varied to achieve the same result. As one variation, the molding 34 may be brought up to the flanges 25 and 26 in straight lengths and curved circumferentially as it is spun around the flanges.

The back plate 34 does not require a die to form the outer flange 46, but has this flange spun together with the ring 46a which procedure saves considerable expense in making and maintaining dies.

Therefore, while we have described in detail one specific method of forming a blower wheel, we do not desire to be limited to that precise method beyond the limitations which may be imposed by the following claims.

We claim:
1. That method of forming a blower wheel which comprises:
   forming a strip of metal into blades thereacross and leaving a land integrally attached along each of the opposing ends of the blades;
   turning a flange at approximately right angles along each of the outer edge portions of said lands and spacing that flange from blade ends by an intervening land portion;
   forming the strip of metal into approximately cylindrical shape with said flanges extending radially;
   forming each of the two lengths of molding into a cross-sectional shape having a transverse web from which a leg extends from each edge portion of the web;
   spinning a first length of molding over one of said flanges to carry those molding legs into compressive engagement about said one flange;
   forming a circular back plate to have a peripheral up and outwardly turned flange;
   placing said back plate across the end of said strip opposite said molding carried strip end and positioning said outwardly turned plate flange on the strip flange; and
   spinning the second length of said molding over and around the two flanges, one of the strip and the other of the plate while the flanges overlie and are in contact one with the other.

2. The method of claim 1, wherein:
   the ends of said flanges are brought into abutment on a radial line; and
   said molding length is located on said radial flange to have its ends abut one another in a zone spaced circumferentially from said strip-flange end abutment.

3. The method of claim 2, in which:
   said abutment of the molding ends is located approximately diametrically opposite the abutment of said flange ends.

4. The method of claim 1, in which:
   the spinning of said other molding brings one portion thereof around and under the strip flange into compressive contact with the said intervening land portion, and a second molding portion is brought down said upturned part of the plate flange and compresses said strip and plate flanges, one against the other longitudinally of the wheel, and said one and second molding portions radially one toward the other.

5. The method of claim 1, in which said back plate up and outwardly turned flange is spun into shape around the plate periphery.

References Cited

UNITED STATES PATENTS

| 1,038,110 | 9/1912 | Foss | 29—156.8 X |
| 2,785,850 | 3/1957 | Sprouse | 29—156.8 X |
| 2,915,239 | 12/1959 | Borkat | 29—156.8 X |
| 2,980,990 | 4/1961 | Sprouse | 29—156.8 |
| 3,138,319 | 6/1964 | Delaney et al. | 29—156.8 X |

FOREIGN PATENTS 264,372  10/1949  Switzerland.

CHARLIE T. MOON, *Primary Examiner.*
PAUL M. COHEN, *Assistant Examiner.*